UNITED STATES PATENT OFFICE.

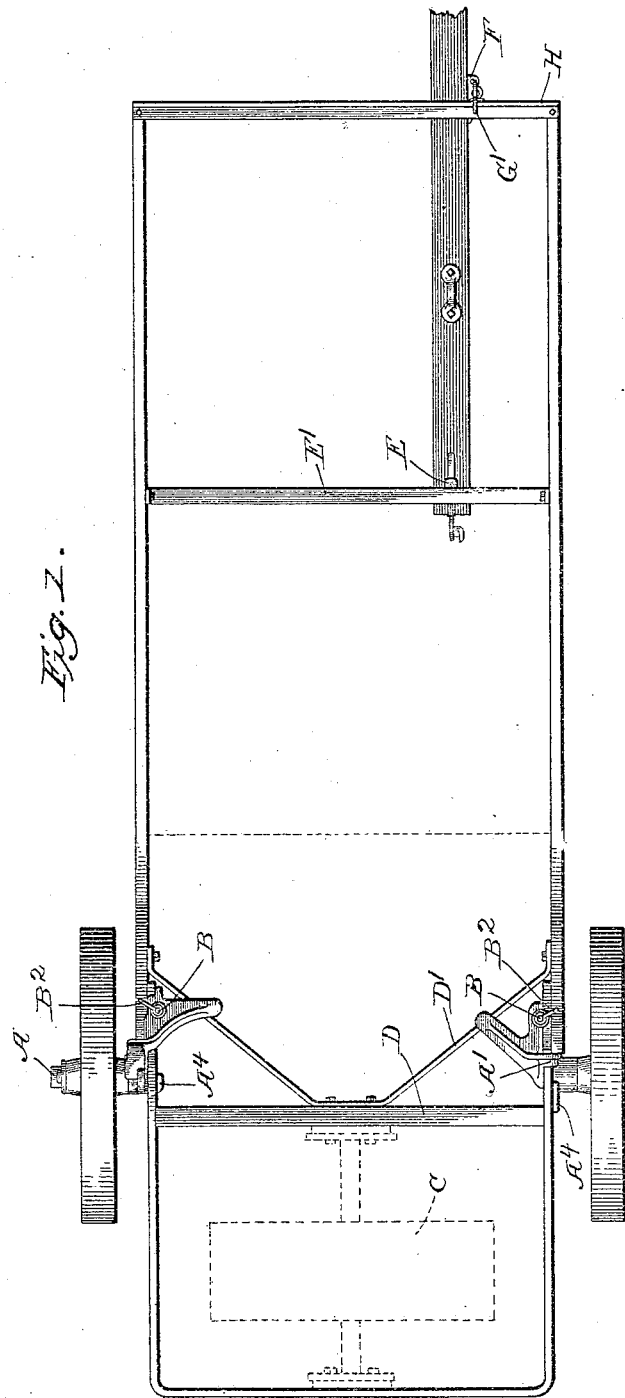
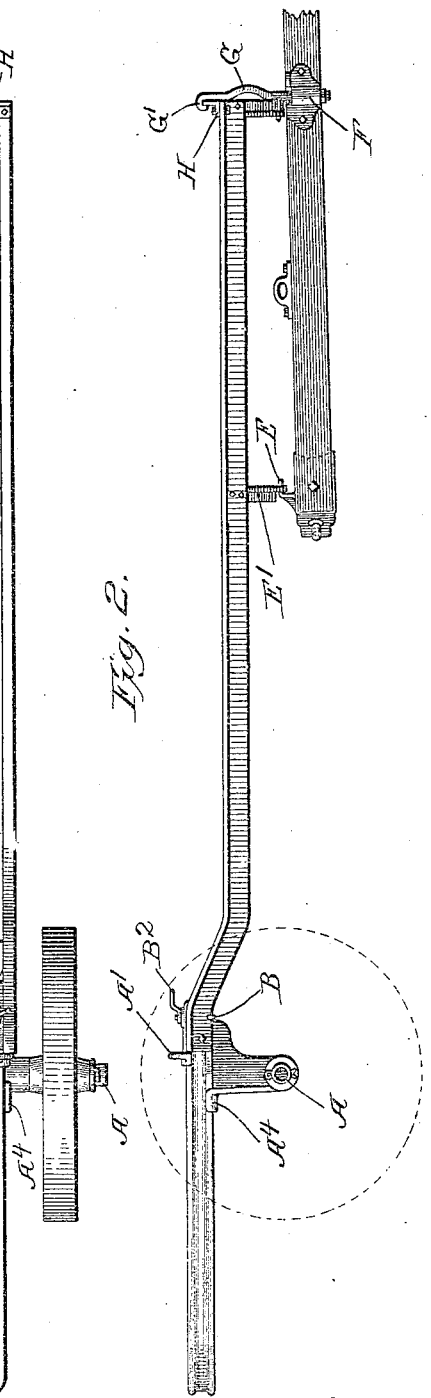

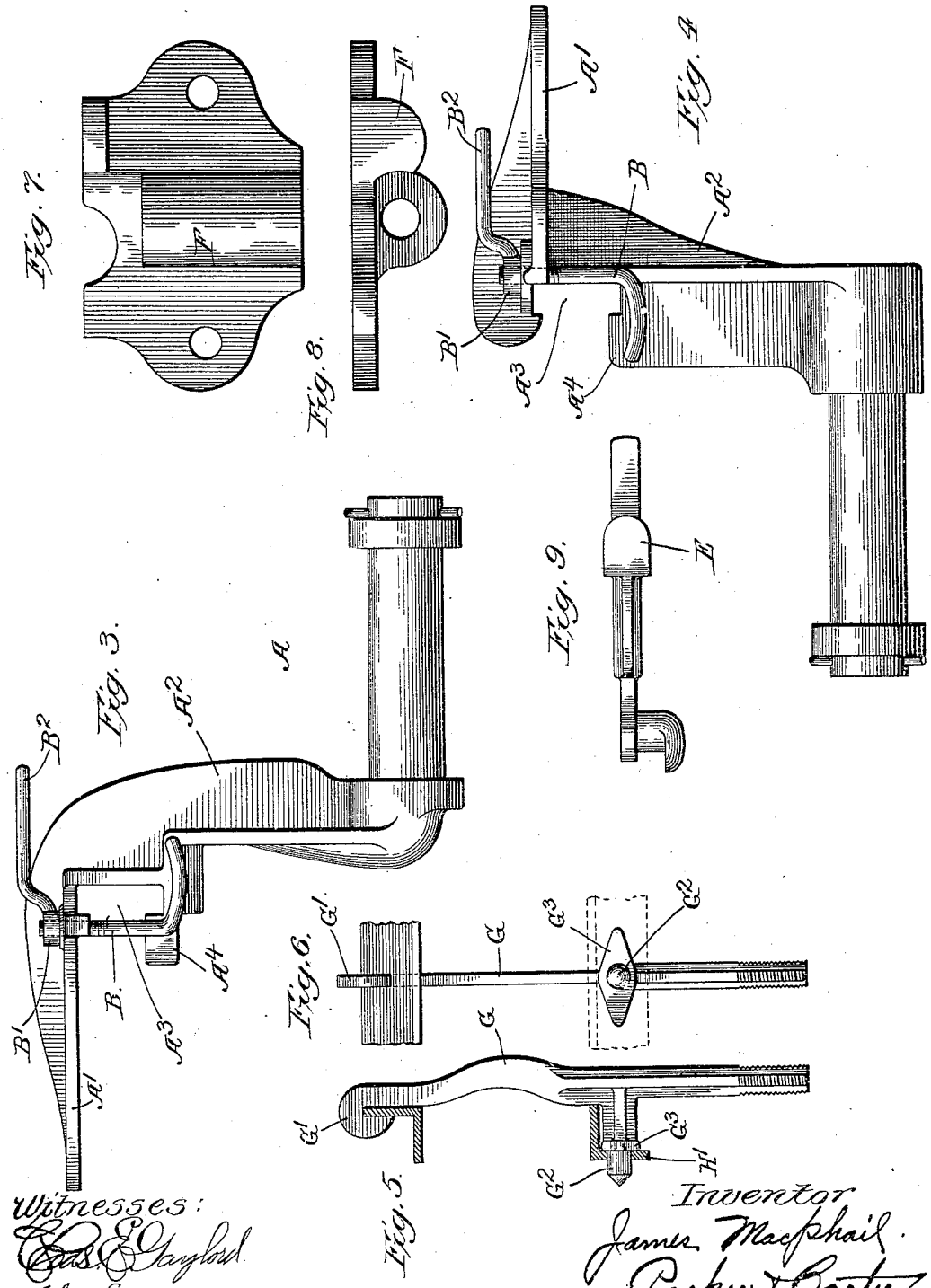

JAMES MACPHAIL, OF BLUE ISLAND, ILLINOIS, ASSIGNOR, BY MESNE ASSIGNMENTS, TO INTERNATIONAL HARVESTER COMPANY, OF CHICAGO, ILLINOIS, A CORPORATION OF NEW JERSEY.

SUPPORTING AND MOVING DEVICE FOR HARVESTERS, &c.

943,090. Specification of Letters Patent. Patented Dec. 14, 1909.

Application filed December 31, 1900. Serial No. 41,598.

*To all whom it may concern:*

Be it known that I, JAMES MACPHAIL, a citizen of the United States, residing at Blue Island, in the county of Cook and State of Illinois, have invented certain new and useful Improvements in Supporting and Moving Devices for Harvesters, &c., of which the following is a specification.

My invention relates to devices for moving machines, which are ordinarily moved by means of some additional device not used in the ordinary operation of the machine, and has for its object to provide a new and improved construction for this purpose.

My invention is illustrated in the accompanying drawings, wherein—

Figure 1 is a plan view of the frame of a grain binder, with parts omitted, showing the application of my invention thereto; Fig. 2 is a side elevation of the construction shown in Fig. 1; Fig. 3 is a side view of one of the detachable wheel supports; Fig. 4 is a side view of one of the detachable wheel supports, showing a modified construction; Fig. 5 is an enlarged side view showing one of the tongue or pole supports or attachments; Fig. 6 is a rear view of Fig. 5; Fig. 7 is a view of one of the engaging parts on the tongue; Fig. 8 is a plan view of Fig. 7; Fig. 9 is a view of the end engaging piece on the tongue.

Like letters refer to like parts throughout the several figures.

In moving machines, such for example as grain binders and the like, it is customary to provide a separate wheeled part or truck, which is placed under the machine when it is desired to move it from one place to another.

The object of my invention is to provide a simple and convenient construction which will take the place of this additional truck and which shall be cheap, efficient and convenient.

Referring now to the accompanying drawings, I have shown in Figs. 1 and 2 the outlines of the lower frame of a grain binder and have omitted the other parts, so as to make my invention clear. In carrying out my invention, I provide two detachable wheel supports A adapted to be fastened directly to the frame of the machine in any desired manner, but preferably so that some part of the frame acts as the axle or connecting link between them.

As illustrated in Fig. 3, the wheel supporting device consists of an arbor upon which the wheel is mounted and a projecting piece $A^1$, which engages some part of the frame, said projecting piece and the arbor being connected by the piece $A^2$. These wheel supports are independent of each other and are easily attached to and detached from the frame, and, when in position, the side of the frame is received into the space $A^3$ between the projecting piece $A^1$ and the part $A^4$. An adjustable fastening device is connected with each wheel support. As shown in the drawing, this fastening device consists of an angular piece B, movably connected to the support and provided with a nut $B^1$ working on a thread on the end of said angular piece. This nut is preferably provided with a handle $B^2$, so that it can be conveniently turned. When the wheel support is slipped in place the nut is screwed down so as to lift the angular piece and cause it to engage the lower face of the frame. It will therefore be seen that each support has three bearing or engaging points upon the side of the frame of the machine, two of said engaging points consisting of the part $A^4$ and the angular piece B engaging the lower face, and the other engaging point consisting of the projecting piece $A^1$ engaging the upper face. This will be readily seen by referring to Fig. 2.

As illustrated in the drawing, the two wheel supports differ in shape. The support on the left hand in Fig. 1, it will be noticed, passes up over the frame on the outside, while the one on the right hand passes up along the frame on the inside of said frame. It is of course evident that a number of variations of this kind may be made, and other variations, to adapt the construction to any particular machine and therefore I do not limit myself in these particulars.

Instead of having an axle extending across beneath the machine to be moved and connecting the two wheels, I use a cross piece or a portion of the framework of the machine as the connecting link or axle. The projecting piece $A^1$ of each wheel support engages this cross piece in any desired manner, and the cross piece, being a portion of the frame, always remains in position. It is of course evident that this feature of my construction depends upon the construction of the machine to which my invention is applied and will of course vary in many cases. As illustrated in Fig. 1, the projecting pieces $A^1$ rest upon one of the supports for the driving wheel C of the machine, which consists in this particular construction of a cross piece D and a cross brace $D^1$, the projecting piece $A^1$ resting upon said brace. The cross brace $D^1$ may be said to consist of diagonally inclined braces and these diagonal braces are engaged by projections on the wheel supports. In placing the wheel supports in position, they are inclined so as to permit the frame piece to pass between the projecting piece $A^1$ and the part $A^4$ (see Fig. 2) and then moved to the position shown in full lines. The tightening of the nut $B^1$ then holds the parts in position. It will be seen that by this construction the two wheels and wheel supports are wholly disconnected and one may be placed in position independent of the other.

When my invention is applied to a grain binder, for example, such as is shown in Fig. 1, the axes of the wheels are at right angles to the axis of the driving wheels in use when the machine is in operation. I therefore provide means for attaching the tongue ordinarily used with the machine to the frame, so that it can be used in connection with the moving device. As illustrated in the drawing, the end of the tongue is provided with an engaging piece E, which engages one of the cross braces $E^1$ of the frame. This engaging piece, as shown, is a part of the end bracket on the tongue, by which it is connected to the machine when it is desired to operate said machine. The tongue is also provided with another engaging part F, which engages a supporting piece or attachment G attached to the frame of the machine. This supporting piece G, as herein shown, is provided at the end with a hook $G^1$, which hooks over the edge of the part H of the frame, and with a projecting pin or part $G^2$ (see Figs. 5 and 6), which passes through a hole in the part $H^1$ of the frame. As herein illustrated these parts of the frame are made of pieces of angle iron. Back of the projection $G^2$ is a shoulder or stop $G^3$, which bears against the frame so as to prevent the backward movement of the tongue. The end of the supporting piece G passes through a hole in the engaging device F and is provided with a nut and thread, by means of which the parts are held in position. It will thus be seen that the tongue is provided with attachments by means of which it can be readily and quickly and securely fastened to the frame, so that it may be used to move the machine from place to place.

I have described in detail a particular construction embodying my invention, but it is of course evident that the form, construction and arrangement of the parts may be varied in many particulars, without departing from the spirit of my invention, and I therefore do not limit myself to the construction shown.

I claim:

1. The combination with the frame of a machine of two independent wheel supports removably connected to the frame, detachable wheels connected with said wheel supports and upon which the machine may be supported, said supports provided with engaging parts which engage the sides of the frame of the machine, diagonal cross braces associated with the frame of the machine, and projecting parts on said supports engaging said diagonal cross braces.

2. A supporting and moving device for machines, comprising two independent wheel supports each wheel support consisting of a central piece having two projecting parts on opposite sides and at an angle thereto, one for receiving the wheel and the other having a part which projects below and another part which projects above a portion of the frame of the machine and between which said frame is received whereby said supports may be detachably attached directly to the main frame of the machine on opposite sides thereof.

3. A supporting and moving device for machines comprising a frame two independent wheel supports, means for detachably attaching said wheel supports directly to the sides of the frame of said machine, diagonal cross braces on said frame, a projecting piece on each of the wheel supports adapted when the wheel supports are in position to engage said diagonal braces.

4. A supporting and moving device for machines, comprising two independent wheel supports adapted to be detachably attached to the frame of said machine, each wheel support provided with three separated engaging parts one of which is intermediate the other two and which engage one of the side pieces of the frame, one of said engaging parts being adjustable.

5. A supporting and moving device for machines, comprising two independent wheel supports adapted to be detachably attached to the frame of said machine, each wheel support provided with three separated engaging parts one of which is intermediate the others and which engages one of the side pieces of the frame, one of said engaging parts being adjustable, a diagonal or inclined brace on the frame and a projecting piece on each wheel support which engages said diagonal or inclined brace.

6. A supporting and moving device for machines, comprising two independent wheel supports adapted to be detachably attached to the frame of said machine, each wheel support having two fixed engaging parts which engage opposite sides of the frame and one adjustable engaging part, which engages the lower side of the frame when the adjustable part is tightened.

7. A supporting and moving device for grain binders and the like, comprising two independent wheel supports adapted to be detachably attached to the frame of said machine and provided with wheels which support the machine when in position, a detachable tongue or pole provided at one end with an engaging device which engages a cross brace of the frame of the machine, and a second engaging device secured to the tongue and which engages a supporting piece, suspended upon the frame and engaging a part thereof, said supporting and engaging pieces detachably connecting the tongue to the frame.

8. The combination with a grain binder or the like, of a detachable tongue or pole adapted to be placed beneath the frame of the machine, and normally in a plane below the plane of said frame, said tongue provided with two separated upwardly projecting engaging parts secured to the tongue and which detachably engage the frame at two different points one engaging part having a hook which hooks over the edge of the frame.

9. The combination with a grain binder or the like of a tongue or pole provided at one end with an engaging device which engages a cross brace of the frame, a second engaging device between the ends of the pole adapted to engage one of the sides of the frame, said second engaging device comprising a supporting piece provided at one end with a hook which engages the frame, and an intermediate pin or projection which passes through a hole in a part of the frame, said pin provided with a stop which engages the frame, said supporting piece provided with means for removably connecting it with the tongue.

10. A supporting and moving device for machines comprising a detachable wheel support adapted to be attached to the frame of the machine, said wheel support provided with two laterally projecting parts projecting in opposite directions at an angle to the support, one forming the arbor for the wheel, the other adapted to engage a cross-piece on the frame, and engaging devices intermediate these parts for engaging a side piece of the frame.

11. An independent wheel support adapted to be detachably attached to the frame of a machine comprising a central piece, provided near one end with a laterally projecting part which forms the arbor of the wheel, and near the other end with a laterally projecting part which engages a portion of the frame, and an engaging part on the central piece for engaging some portion of said frame.

12. A supporting and moving device for machines comprising a frame a detachable wheel support adapted to be attached to the frame of the machine, and extending only part way across said frame said wheel support having a part which engages the under side of a portion of the frame, and another part which projects inwardly above the frame and engages the upper face of a portion thereof, said support bent at an angle at one end, said bent portion forming the spindle of the wheel and being in the same vertical plane as the main part of the support when the support is in position.

JAMES MACPHAIL.

Witnesses:
R. B. SWIFT,
CHAS. W. ALLEN.